United States Patent
Kim et al.

(10) Patent No.: US 12,459,519 B2
(45) Date of Patent: Nov. 4, 2025

(54) METHOD AND APPARATUS FOR DETECTING ROAD CONDITION TO PROVIDE ACTIVE SUSPENSION FUNCTION

(71) Applicant: HYUNDAI MOBIS CO., LTD., Seoul (KR)

(72) Inventors: Jeong Ku Kim, Yongin-si (KR); Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 370 days.

(21) Appl. No.: 17/942,264

(22) Filed: Sep. 12, 2022

(65) Prior Publication Data
US 2023/0123508 A1   Apr. 20, 2023

(30) Foreign Application Priority Data

Oct. 19, 2021 (KR) .................. 10-2021-0139484
Oct. 19, 2021 (KR) .................. 10-2021-0139485

(51) Int. Cl.
*B60G 17/0165*   (2006.01)
*B60G 17/019*    (2006.01)
*B60W 40/06*     (2012.01)

(52) U.S. Cl.
CPC ......... *B60W 40/06* (2013.01); *B60W 2510/22* (2013.01); *B60W 2554/4041* (2020.02)

(58) Field of Classification Search
CPC ........ B60G 2400/823; B60G 17/01908; B60G 2400/252; B60G 2400/82; B60G 2401/142; B60G 2401/16; B60G 2401/28; B60G 17/0165; B60G 2500/30; B60W 40/06; B60W 2510/22; B60W 2554/4041; B60W 2556/45
USPC ........................................... 701/1
See application file for complete search history.

(56) References Cited

U.S. PATENT DOCUMENTS

| | | | |
|---|---|---|---|
| 10,688,841 B1* | 6/2020 | Chen .................. | B60G 17/0165 |
| 2017/0106855 A1* | 4/2017 | Lavoie ............. | B60W 50/0097 |
| 2018/0079272 A1* | 3/2018 | Aikin ................... | B60W 10/22 |
| 2019/0023094 A1* | 1/2019 | Panagis ............. | B60G 17/0182 |
| 2022/0036097 A1* | 2/2022 | Ogino ..................... | G01C 7/04 |
| 2022/0063364 A1* | 3/2022 | Tao .................... | B60G 17/0155 |
| 2022/0170752 A1* | 6/2022 | Beaurepaire ...... | B60W 50/0205 |
| 2022/0366731 A1* | 11/2022 | Honjo ................. | G07C 5/0841 |

\* cited by examiner

*Primary Examiner* — Rachid Bendidi
*Assistant Examiner* — Hossam M Abd El Latif
(74) *Attorney, Agent, or Firm* — NovoTechIP International PLLC

(57) ABSTRACT

The present disclosure relates to a mobility device having an active suspension function and method therefor. The mobility device may include: a suspension module located between a wheel and a sash of the mobility device and configured to perform a suspension function to the mobility device; a sensor module comprising an inclinometer and a ride height sensor; and a communication module configured to support vehicle-to-everything (V2X) communication. The communication module may be configured to provide, as first suspension module control information for a subsequent mobility device, road surface information obtained by the inclinometer and the ride height sensor during driving of the mobility device based on the V2X communication.

11 Claims, 10 Drawing Sheets

METHOD AND APPARATUS FOR DETECTING ROAD CONDITION TO PROVIDE ACTIVE SUSPENSION FUNCTION

CROSS-REFERENCE TO RELATED APPLICATIONS

Pursuant to 35 U.S.C. § 119(a), this application claims the benefit of priority to Korean Patent Application Nos. 10-2021-0139484 and 10-2021-0139485, both filed on Oct. 19, 2021, of which the disclosure is incorporated herein by reference in their entirety.

TECHNICAL FIELD

The present embodiments relate to a method and apparatus for detecting road conditions to provide an active suspension function, and more particularly, to a road surface detection apparatus for providing an active suspension function by enabling a subsequent mobility device to use road surface information obtained by a preceding mobility device while driving and method therefor.

BACKGROUND

In general, a suspension module is installed between the wheel and sash of a vehicle to increase the ride comfort of the vehicle. The suspension module enables stable driving by adjusting the height of the vehicle depending on road surface conditions that the vehicle experiences while driving.

However, conventional suspension modules have had limitations in quickly responding to sudden changes in road surface conditions during driving. To overcome such an issue, an active suspension function has been recently introduced to vehicles as illustrated in FIG. 1.

FIG. 1 is a diagram for explaining the active suspension function applied to recent vehicles.

Specifically, FIG. 1(A) is a diagram illustrating a technique for monitoring road surface conditions of a driving route in advance based on images, which are taken by a camera 110 installed in front of a vehicle 100, and starting control of the suspension function in advance based on the road surface conditions. The camera 110 in front of the vehicle 100 may be a single camera, a stereo camera, and so on, which is capable of monitoring the road surface conditions about 4.5 to 13.7 m ahead in advance to control the suspension function.

FIG. 1(B) is a diagram illustrating the concept of an active suspension service for analyzing the driving state of a preceding vehicle 130 based on the camera 110 installed in the subsequent vehicle 100 and controlling the suspension function in advance based on the driving state of the preceding vehicle 130.

However, since all of the active suspension methods described above in FIGS. 1(A) and 1(B) are based on images captured by the camera 110, it is difficult to obtain accurate road surface conditions if the images captured by the camera 110 have low resolution due to driving at night.

In addition, when the suspension function is controlled based on the driving state of the preceding vehicle 130 as shown in FIG. 1(B), the driving state may vary depending on the type of the preceding vehicle 130 and the type of suspension mounted on the preceding vehicle 130. As a result, it may be difficult to use the driving state of the preceding vehicle 130 as accurate information.

SUMMARY

An object of the present disclosure is to provide an apparatus for providing road surface information obtained by an inclinometer and a ride height sensor of a preceding mobility device such as a preceding vehicle during driving of the preceding mobility device to a subsequent mobility device via vehicle-to-everything (V2X) communication and method therefor.

Another object of the present disclosure is to provide a method for a subsequence mobility device to control a suspension function based on information provided by a preceding mobility device and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, there is provided a road surface detection apparatus configured to perform an active suspension function. The road surface detection apparatus may include: a sensor module including an inclinometer and a ride height sensor; and a communication module configured to support vehicle-to-everything (V2X) communication. The communication module may be configured to provide, as first suspension module control information for a subsequent mobility device, road surface information obtained by the inclinometer and the ride height sensor during driving of a mobility device having mounted therein the road surface detection apparatus, via the V2X communication.

The mobility device may further include a suspension module located between a wheel and a sash of the mobility device and configured to perform a suspension function to the mobility device.

The communication module may be configured to receive second suspension module control information obtained by a road surface detection apparatus of a preceding mobility device, and the suspension module may be controlled based on the second suspension module control information before the mobility device actually arrives at a road surface position associated with the second suspension module control information.

The first suspension module control information may include information on a height of a corresponding road surface, information on an inclination of the corresponding road surface, and information on a position of the corresponding road surface.

The information on the inclination of the corresponding road surface may include at least one of information on an inclination in a moving direction of the mobility device, information on left and right inclinations with respect to the moving direction of the mobility device, and information on diagonal inclinations with respect to the moving direction of the mobility device.

The sensor module may further include a surface condition sensor, and the first suspension module control information may include information on a height of a corresponding road surface, information on an inclination of the corresponding road surface, information on a surface condition of the corresponding road surface, and information on a position of the corresponding road surface.

The road surface detection apparatus may include a processor functionally connected to the sensor module and the communication module, and the processor may be configured to secure the road surface information obtained by the inclinometer and the ride height sensor during the driving of the mobility device, calculate the first suspension module information based on the road surface information, and provide the first suspension module information to the communication module.

The communication module may be configured to provide the first suspension module control information to a communication module of the subsequent mobility device via vehicle-to-vehicle (V2V) communication when the subsequent mobility device is within a predetermined distance.

The communication module may be configured to provide the first suspension module control information to a suspension control information server so that the subsequent mobility device is provided with the first suspension module control information upon arriving at a position associated with the first suspension module control information.

The mobility device may include at least one of a vehicle, a robot, and a bike.

In another aspect of the present disclosure, there is provided a mobility device having an active suspension function. The mobility device may include: a communication module configured to receive first suspension module control information generated by a preceding mobility device on a driving route of the mobility device via V2X communication; and a suspension module located between a wheel and a sash of the mobility device and configured to control a suspension function of the mobility device based on the first suspension module control information received by the communication module before the mobility device actually arrives at a road surface position associated with the first suspension module control information.

The mobility device may further include a processor functionally connected to the communication module and the suspension module, and the processor may be configured to start control of damping or stiffness of the suspension module based on the first suspension module control information received by the communication module before the mobility device actually arrives at the road surface position associated with the first suspension module control information.

The communication module may be configured to receive the first suspension module control information via V2V communication when the preceding mobility device is within a predetermined distance.

The communication module may be configured to receive the first suspension module control information from a suspension control information server when the mobility device arrives at the road surface position associated with the first suspension module control information.

In another aspect of the present disclosure, there is provided a method of performing an active suspension function to a mobility device. The method may include: obtaining inclination information obtained by an inclinometer during driving of the mobility device; obtaining ride height information obtained by a ride height sensor during the driving of the mobility device; comparing the inclination information and the ride height information with predetermined standards; and providing first suspension module control information generated based on the comparison with the predetermined standards through a communication module via V2X communication.

The method may further include: receiving second suspension module control information obtained by a preceding mobility device; and starting control of a suspension module of the mobility device based on the second suspension module control information before the mobility device actually arrives at a road surface position associated with the second suspension module control information.

The suspension module of the mobility device may be located between a wheel and a sash of the mobility device and configured to adjust a driving height of the mobility device based on the second suspension module control information.

The first suspension module control information may include information on a height of a corresponding road surface, information on an inclination of the corresponding road surface, and information on a position of the corresponding road surface.

The information on the inclination of the corresponding road surface may include at least one of information on an inclination in a moving direction of the mobility device, information on left and right inclinations with respect to the moving direction of the mobility device, and information on diagonal inclinations with respect to the moving direction of the mobility device.

Thee mobility device may include the inclinometer, the ride height sensor, and a surface condition sensor as a sensor module, and the first suspension module control information may include information on a height of a corresponding road surface, information on an inclination of the corresponding road surface, information on a surface condition of the corresponding road surface, and information on a position of the corresponding road surface.

The communication module may be configured to provide the first suspension module control information to a communication module of a subsequent mobility device via V2V communication when the subsequent mobility device is within a predetermined distance.

The communication module may be configured to provide the first suspension module control information to a suspension control information server so that a subsequent mobility device is provided with the first suspension module control information upon arriving at a position associated with the first suspension module control information.

The mobility device may include at least one of a vehicle, a robot, and a bike.

In another aspect of the present disclosure, there is provided a method of performing an active suspension function to a mobility device. The method may include: receiving first suspension module control information generated by a preceding mobility device on a driving route of the mobility device via V2X communication; determining whether the mobility device is within a predetermined range from a road surface position associated with the first suspension module control information, based on the first suspension module control information received by a communication module; and when it is determined that the mobility devices is within the predetermined range from the road surface position associated with the first suspension module control information, starting control of a suspension function of the mobility device before the mobility device actually arrives at the road surface position.

The mobility device may further include a processor functionally connected to the communication module and a suspension module, and the method may include starting, by the processor, control of damping or stiffness of the suspension module based on the first suspension module control information received by the communication module before the mobility device actually arrives at the road surface position associated with the first suspension module control information.

Receiving the first suspension module control information may include receiving the first suspension module control information from a suspension control information server when the mobility device arrives at the road surface position associated with the first suspension module control information.

According to the embodiments of the present disclosure described above, a preceding mobility device such as a preceding vehicle may extract suspension module control information from road surface information obtained by an inclinometer and a ride height sensor of the preceding mobility device while driving and efficiently provide the suspension module control information to a subsequent mobility device through vehicle-to-everything (V2X) communication.

According to the embodiments of the present disclosure described above, a subsequence mobility device may start control of a suspension module based on suspension module control information received from a preceding mobility device through V2X communication before arriving at a corresponding road surface, thereby performing a stable suspension function compared to an active suspension function based on images captured by a camera It will be appreciated by persons skilled in the art that the effects that could be achieved with the present disclosure are not limited to what has been particularly described hereinabove and other advantages of the present disclosure will be more clearly understood from the following detailed description.

DETAILED DESCRIPTION

Figure 1:
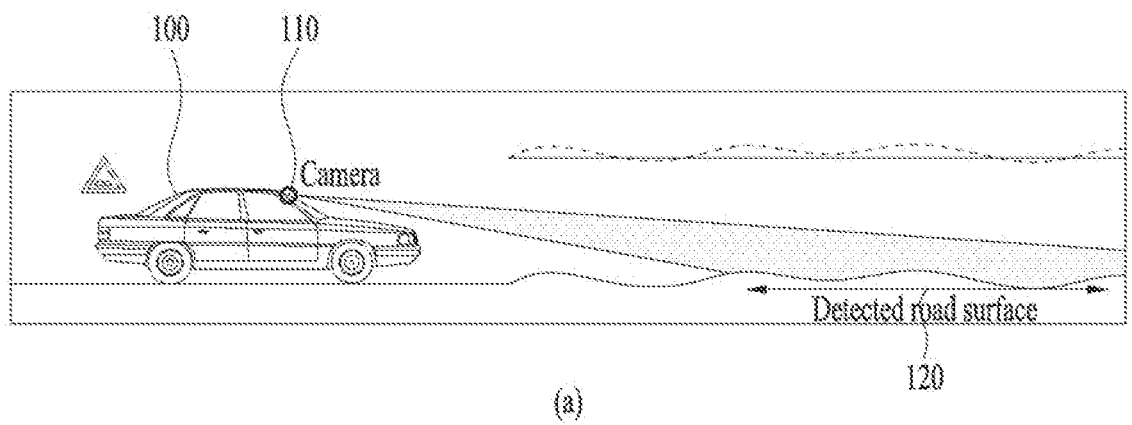
FIG. 1 is a diagram for explaining an active suspension function applied to recent vehicles.
Figure 1:
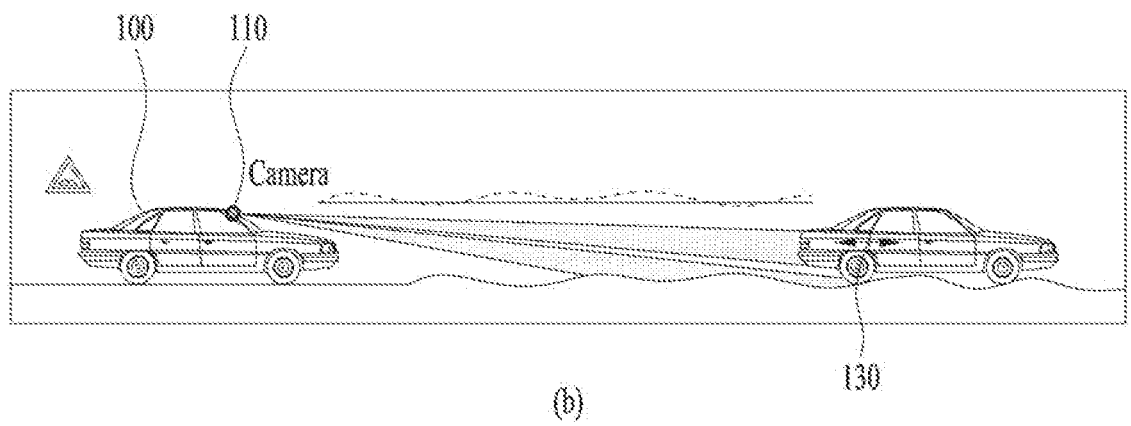

Hereinafter, embodiments of present disclosure will be described in detail with reference to the accompanying drawings to enable one of ordinary skill in the art to which the present disclosure belongs to easily embody and practice the present disclosure. However, the present disclosure is not limited to the embodiments described herein and may be implemented in various forms. In the drawings, irrelevant parts irrelevant are omitted to clarify the present disclosure, and similar reference numerals are attached to similar parts throughout the specification.

Throughout the specification, when it is said that a certain portion "comprises or includes" a certain component, it may be interpreted to mean that other components are not excluded but may be further included unless specified otherwise.

Figure 2:
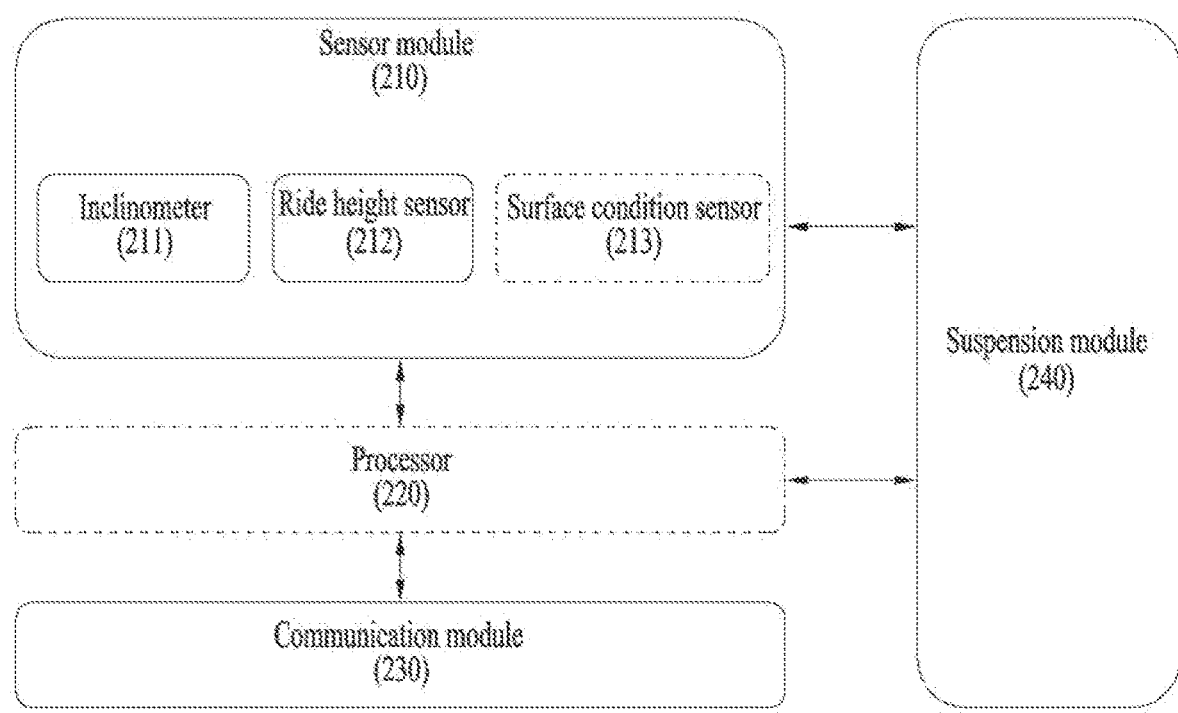
FIG. 2 is a diagram for explaining the concept of a road surface detection apparatus or mobility device having an active suspension function according to an embodiment of the present disclosure.

FIG. 2 is a diagram for explaining the concept of a road surface detection apparatus or mobility device having an active suspension function according to an embodiment of the present disclosure.

Herein, the term "mobility device" does not need to be limited to vehicles and may cover a variety of mobility devices, i.e., a variety of transportation means capable of providing stable riding comfort, easy wheel control, and so on based on suspension functions. That is, the term "mobility device" may include a robot, a bike, etc.

The road surface detection apparatus shown in FIG. 2 may include a sensor module 210 and a communication module 230. In addition, the road surface detection apparatus may further include a processor 220 functionally connected to the sensor module 210 and the communication module 230 as shown in FIG. 2. In this embodiment, the road surface detection apparatus is assumed to be an apparatus installed in the mobility device and configured to generate road surface suspension control information, rather than directly including a suspension module 240. In addition, the mobile device is assumed to be a device capable of performing active suspension operation by itself, including the suspension module 240. However, the road surface detection apparatus and the mobility device may be interchangeably used with each other as long as there is no confusion therebetween.

The above-described processor 220 may be implemented in the form of an electronic control unit (ECU). However, in some cases, the processor 220 may be assumed to be an implicit configuration that may be distributed in individual functional configurations rather than an independent configuration.

In FIG. 2, the sensor module 210 may include an inclinometer 211 and a ride height sensor 212, and in some cases, the sensor module 210 may further include a surface condition sensor 213. The inclinometer 211 may be a gyroscope sensor or G sensor, but the inclinometer 211 does not need to be limited to a specific type of sensor as long as the sensor is capable of measuring the inclination of the mobility device, which will be described later.

The mobility device shown in FIG. 2 may include the communication module 230 configured to support vehicle-to-everything (V2X) communications. As is well known, V2X communications refers to a concept that broadly encompasses various methods such as vehicle-to-vehicle (V2V) communications, vehicle-to-infrastructure (V2I) communications, vehicle-to-pedestrian (V2P) communications, and so on. Information on a preceding mobility device may be transmitted to a subsequent mobility device via V2V or V2I communications.

The mobility device shown in FIG. 2 may include the suspension module 240 positioned between the wheel and sash of the mobility device to perform a suspension function to the mobility device. The suspension module 240 may be connected to the sensor module 210 and configured to obtain road surface information during driving. In addition, the obtained road surface information may be provided to a subsequent mobility device as suspension module control information, and the subsequent mobility device may start to control the suspension module 240 in advance based on the suspension module control information.

Figure 3:
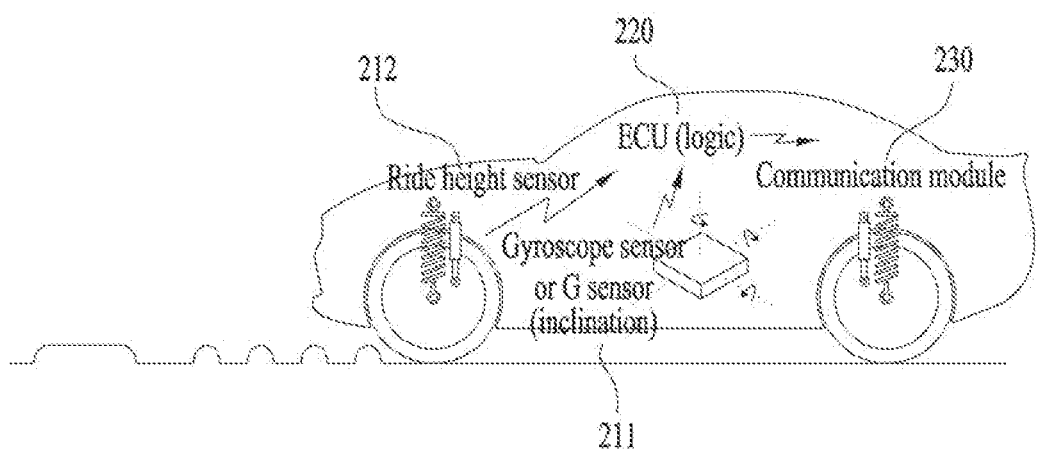
FIG. 3 is a diagram illustrating an example in which the configurations of the mobility device described in FIG. 2 are mounted on a vehicle.

FIG. 3 is a diagram illustrating an example in which the configurations of the mobility device described above in FIG. 2 are mounted on a vehicle.

Referring to FIG. 3, the ride height sensor 212 is installed in the vehicle to obtain information on the height of a road surface while driving, and the obtained information may be transmitted to the ECU 220 by wire or wirelessly. In FIG. 3, a gyroscope sensor or G sensor is illustrated as an example of the inclinometer 211. Information on the inclination of the road surface obtained by the gyroscope sensor or G sensor may also be transmitted to the ECU 220 by wire or wirelessly.

Although not shown in FIG. 3, suspension control information provided to a subsequent vehicle may include information on the position of the corresponding road surface in addition to the information on the inclination and height of the road surface. The subsequent vehicle may start to control its own suspension function in advance based on the location information In the example of FIG. 3, the communication module 230 may receive the information on the inclination and height of the road surface from the ECU 220 and forward the information to the subsequent vehicle.

However, the configurations of the vehicle shown in FIG. 3 are merely examples of the mobility device described above in FIG. 2, and the mobility device in this embodiment may include various mobility devices, such as a vehicle, a robot, a bike, etc. Accordingly, the above-described inclination information may include not only information on an inclination between the front and rear wheels of the vehicle but also information on left and right inclinations and information on diagonal inclinations with respect to the route.

Figure 4:
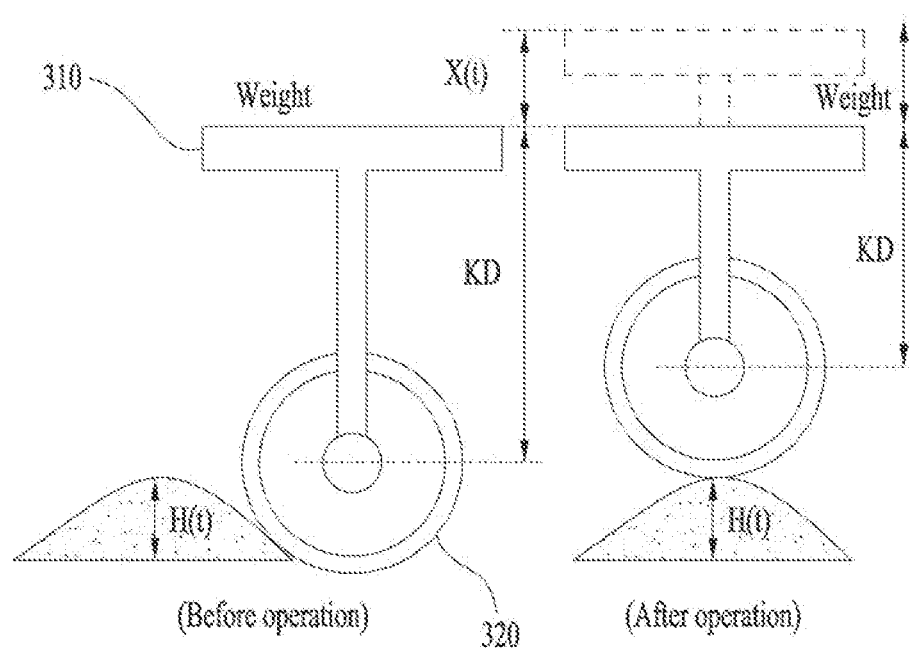
FIG. 4 is a diagram for explaining a method of processing ride height information according to an embodiment of the present disclosure.

FIG. 4 is a diagram for explaining a method of processing ride height information according to an embodiment of the present disclosure.

FIG. 4 illustrates an example in which a mobility device passes through a bump formed on a road. First, the height of the road bump is denoted by H(t). The vertical variation of a sash 310 of the mobility device is denoted by X(t), and the damping displacement caused by the suspension operation while a wheel 320 of a vehicle passes through the bump is denoted by KD. Considering the change over time, KD may also be represented as KD(t).

Under this assumption, X(t) and KD may be regarded as information that the mobility device may obtain. This embodiment proposes to calculate and use H(t) as shown in Equation 1 below.

$$H(t)=X(t)-KD(t) \quad \text{[Equation 1]}$$

Figure 5:
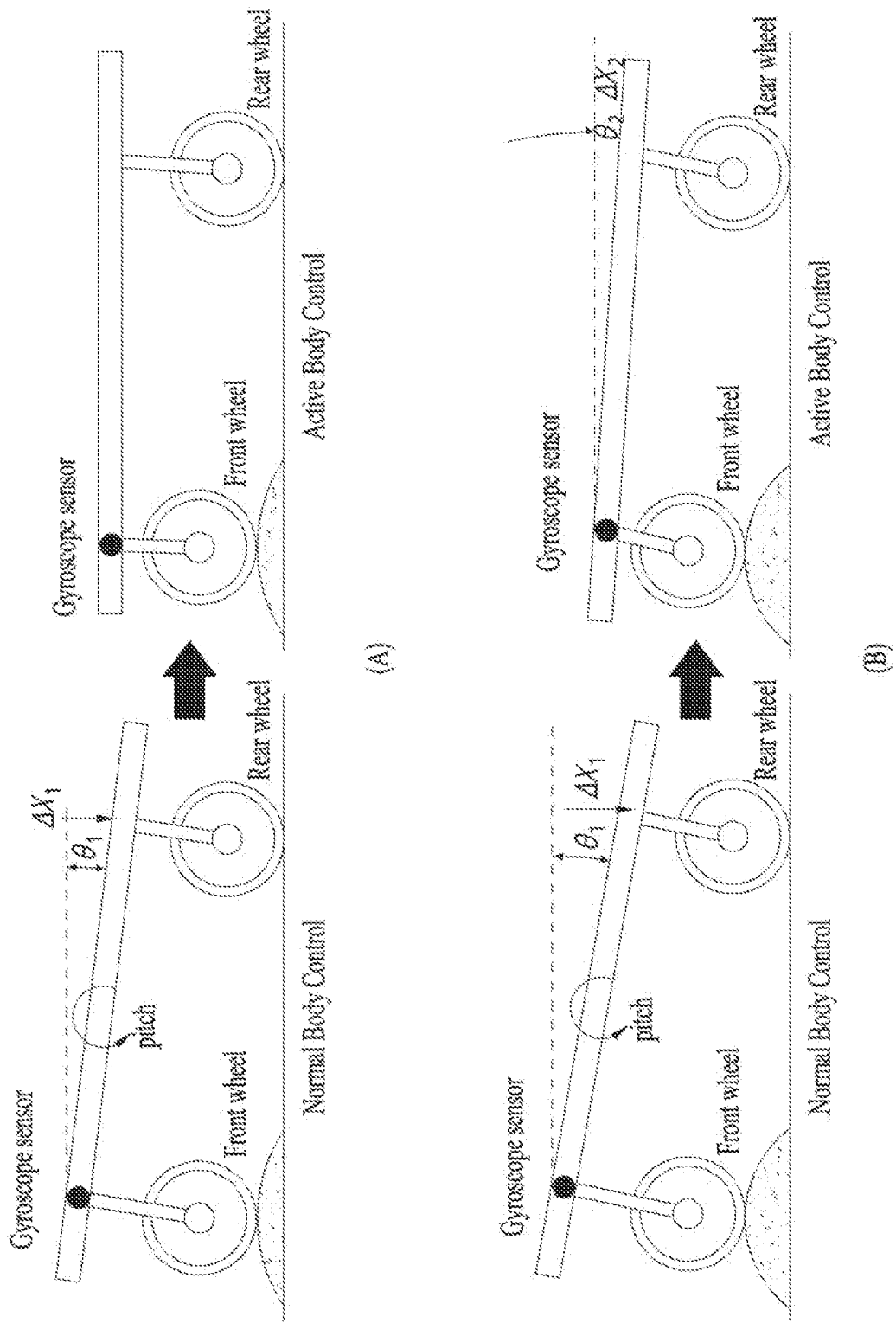
FIG. 5 is a diagram for explaining a method of processing information on the inclination of a road surface according to an embodiment of the present disclosure.

FIG. 5 is a diagram for explaining a method of processing information on the inclination of a road surface according to an embodiment of the present disclosure.

First, FIG. 5(A) shows a case in which the height H(t) of a bump is smaller than a predetermined level, so that the front and rear are capable of being leveled by an active body control function of a suspension module, and FIG. 5(B) shows a case in which the height H(t) of a bump is greater than the predetermined level, and thus there is a difference between the ride heights of the front and rear in spite of the active vehicle body control function.

Specifically, when the height H(t) of the bump of FIG. 5(A) is smaller than a damping displacement difference between the front and rear, ΔKD(t), which is controllable by the active body control function, the ride height X(t) may be controlled to be constant. This may be expressed as shown in Equation 2 below.

$$\text{If } H(t)<=\Delta KD(t),\ X(t)=H(t)-\Delta KD(t)=0 \quad \text{[Equation 2]}$$

On the other hand, when the height H(t) of the bump of FIG. 5(B) is greater than the damping displacement difference between the front and rear, ΔKD(t), there may be a change in the ride height X(t). Thus may be expressed as shown in Equation 3 below.

$$\text{If } H(t)>\Delta KD(t),\ X(t)=H(t)-\Delta KD(t)>0 \quad \text{[Equation 3]}$$

In summary, a preceding mobility device may obtain information on the inclination and height of a road surface by means of the inclinometer and ride height sensor while driving. Then, the preceding mobility device may provide the obtained information as suspension module control information (e.g., H(t), ΔKD(t), etc.) to a subsequent mobility device based on the above-described equations. In addition, when the sensor module 210 additionally includes the surface condition sensor 213, the suspension module control information may include information on the height of the corresponding road surface (e.g., H(t)), information on the inclination of the corresponding road surface (e.g., ΔKD(t), which may be measured in the left-right or diagonal directions), information on the surface condition of the corresponding road surface (e.g., how wet the surface is, whether the surface is icy, etc.), and information on the location of the corresponding road surface.

Figure 6:
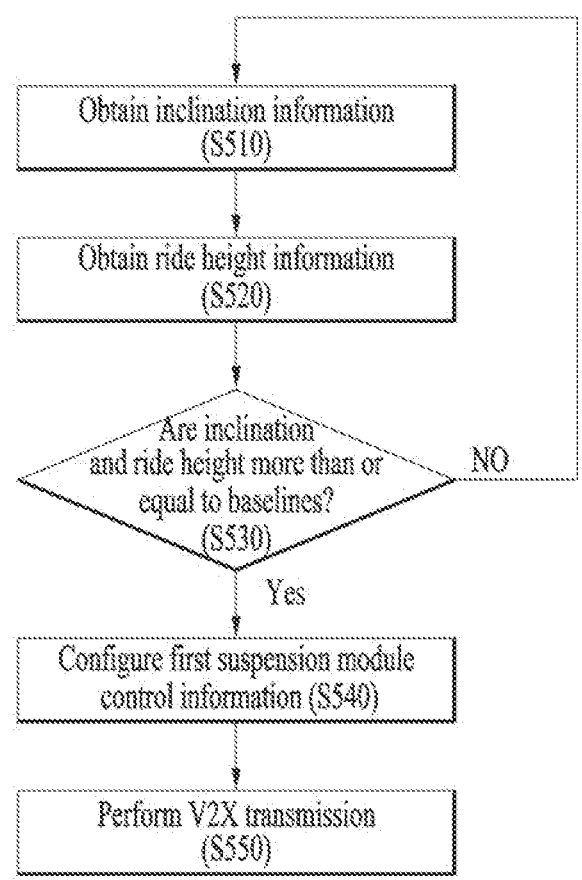
FIG. 6 is a diagram for explaining a method of performing an active suspension function to a mobility device according to an embodiment of the present disclosure.

FIG. 6 is a diagram for explaining a method of performing an active suspension function to a mobility device according to an embodiment of the present disclosure.

First, in step S510, the mobility device may obtain inclination information from an inclinometer while driving. The mobility device may obtain ride height information from a ride height sensor while driving (S520). The obtained inclination information and ride height information may be compared with predetermined standards by a processor of the mobility device (S530). For example, the processor may check whether a change in the height of a road surface H(t) is greater than or equal to ΔKD(t) as described above in FIG. 5. The irregularity of the road surface may be determined according to the standards. That is, in the case of a steep slope in which the irregularity of the road surface becomes more than or equal to a prescribed level, the importance/urgency may increase to configure suspension control information for a subsequent mobility device. In addition, when there are insignificant changes in the road surface condition, the suspension control information may not need to be provided to the subsequent moving vehicle. FIG. 6 illustrates a case in which first suspension information is not configured when a change in the inclination/height is greater than or equal to a prescribed level, but the present disclosure is not limited thereto.

It may be identified whether the driving route of the subsequent vehicle is flat or uneven. In addition, it may also be identified what is the difference in height in the flat.

If the inclination and height of the road surface are greater than or equal to the predetermined standards, the inclination information, road surface height information, and road surface position information may be configured as the first suspension control information. If necessary, road surface condition information may be further included (S540).

The configured first suspension control information may be transmitted to the subsequent mobility device via V2X communications (S550). In some cases, the first suspension control information may be directly transmitted to the subsequent mobility device via V2V communications. In addition, the first suspension control information may be transmitted to a suspension control information server via V2I communications, which will be described in detail later.

Figure 7:
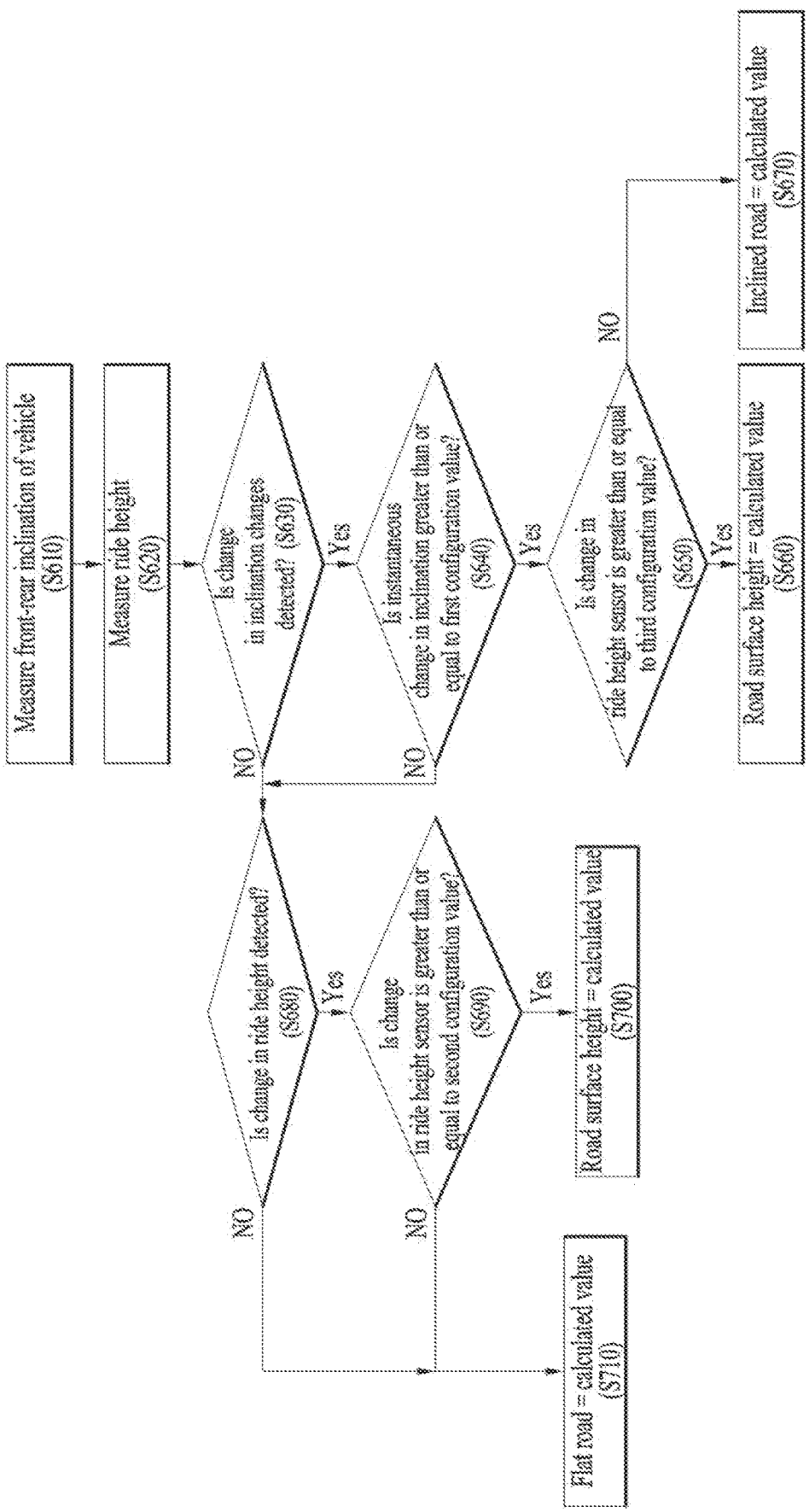
FIG. 7 is a diagram for explaining a method of performing an active suspension function when the method of FIG. 6 is applied to a vehicle according to a preferred embodiment of the present disclosure.

FIG. 7 is a diagram for explaining a method of performing an active suspension function when the method of FIG. 6 is applied to a vehicle according to a preferred embodiment of the present disclosure.

First, when the active suspension function is applied to the vehicle as shown in FIG. 7, the vehicle may measure an inclination between the front and rear (S610) and measure a ride height (S620). Based on the inclination and ride height, the vehicle may determine whether a change in the inclination is detected in step S630 (S630). If the inclination change is detected, the vehicle may proceed to step S640 to determine whether an instantaneous change in the inclination of the previous application is greater than or equal to a first configuration value (S640). When it is determined that the instantaneous change in the inclination is greater than or equal to the first configuration value, the vehicle may additionally determine whether a change in the ride height sensor is greater than or equal to a third configuration value (S650). When it is determined that the change in the ride height sensor is greater than or equal to the third configuration value, it may mean that there is a large bump, and thus the vehicle may calculate the height of a road surface according to Equation 1 (S660). On the contrary, when it is determined that the change in the ride height sensor is less than the third configuration value, it may mean that the road is merely inclined, and thus, the vehicle may calculate a value related to the inclined road according to Equations 2 and 3 (S670).

According to this embodiment, if no inclination change is detected in step S630, the vehicle may proceed to step S680 to determine whether a change in the ride height is detected. If the change in the ride height is detected, the vehicle may determine whether the change in the ride height sensor is greater than a second configuration value (S690). When the change in the ride height sensor is greater than the second configuration value, it may mean that the road surface is wavy, and thus, the vehicle may calculate the height of the road surface according to Equation 1 (S700). On the other hand, when it is determined that the change in the ride height sensor is less than or equal to the second configuration value, it may mean that the corresponding road surface is flat, and thus, the vehicle may compute information related to the flat road (S710).

Figure 8:
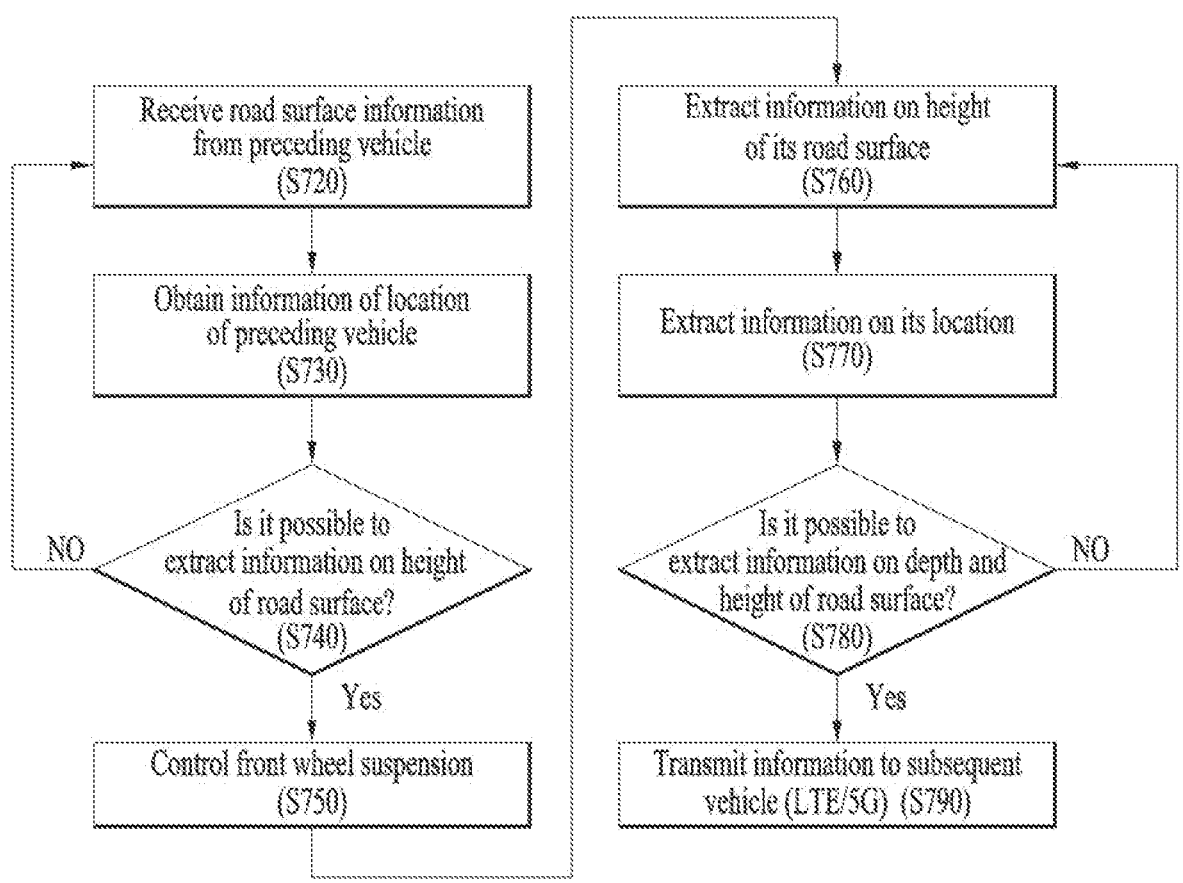
FIG. 8 is a diagram for explaining a method in which a subsequent mobility device receives suspension control information and preemptively controls a suspension function according to an embodiment of the present disclosure.

FIG. 8 is a diagram for explaining a method in which a subsequent mobility device receives suspension control information and preemptively controls a suspension function according to an embodiment of the present disclosure.

First, in step S720, the subsequent mobility device may receive first suspension module control information generated by a preceding mobility device (e.g., front vehicle) on the driving route of the subsequent mobility device through V2X communications. The first suspension module control information may include ride height/inclination information as described above.

In FIG. 8, the subsequent mobility device may obtain information on the location of the preceding mobility device (e.g., front vehicle) (S730). The information on the location of the preceding mobility device may be received as the above-described first suspension module control information or as separate control information.

In step S740, the subsequent mobility device may determine whether the subsequent mobility device is capable of extracting information on the height of a front road surface in the driving direction based on the above-described information (S740). If the subsequent mobility device is capable of extracting the information on the height of the front road surface, the corresponding mobility device may start to control a front wheel suspension (S750).

The subsequent mobility device may extract information on the height of its own road surface (S760) and extract information on its own location (S770). For example, the subsequent mobility device may extract the information on the height of its own road surface as H(t) and extract the information on its own location via the Global Positioning System (GPS). Referring to FIG. 8, it may be seen that if the subsequent mobility device is allowed to extract such information (S780), the preceding mobility device may generate second suspension control information to be transmitted to the subsequent vehicle and transmit the second suspension control information to the subsequent mobility device based on LTE/5G.

Figure 9:
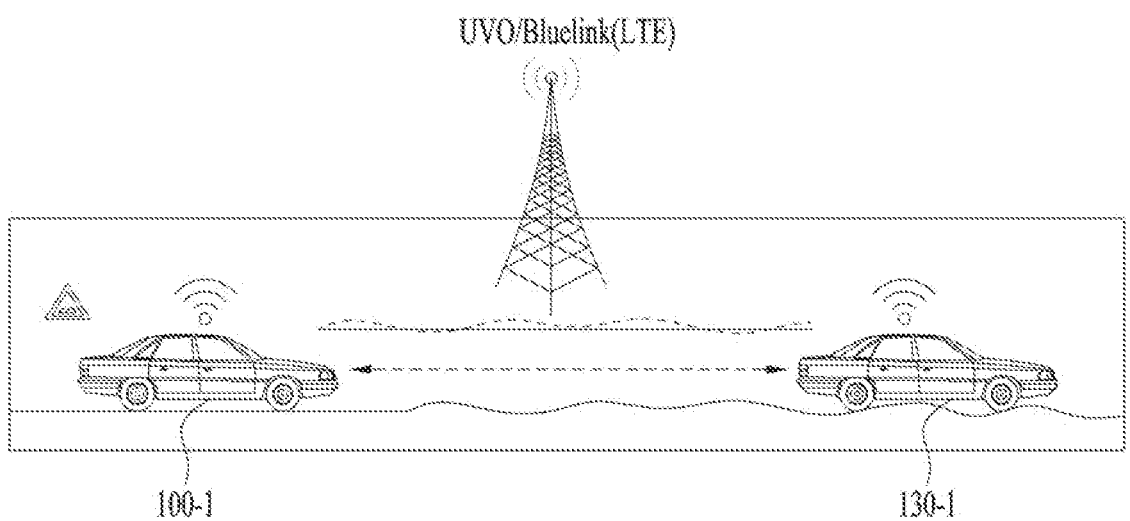
FIGS. 9 and 10 are diagrams for explaining a case in which suspension control information is transmitted via vehicle-to-vehicle (V2V) and a case in which suspension control information is transmitted via vehicle-to-infrastructure (V2I) according to an embodiment of the present disclosure.
Figure 10:
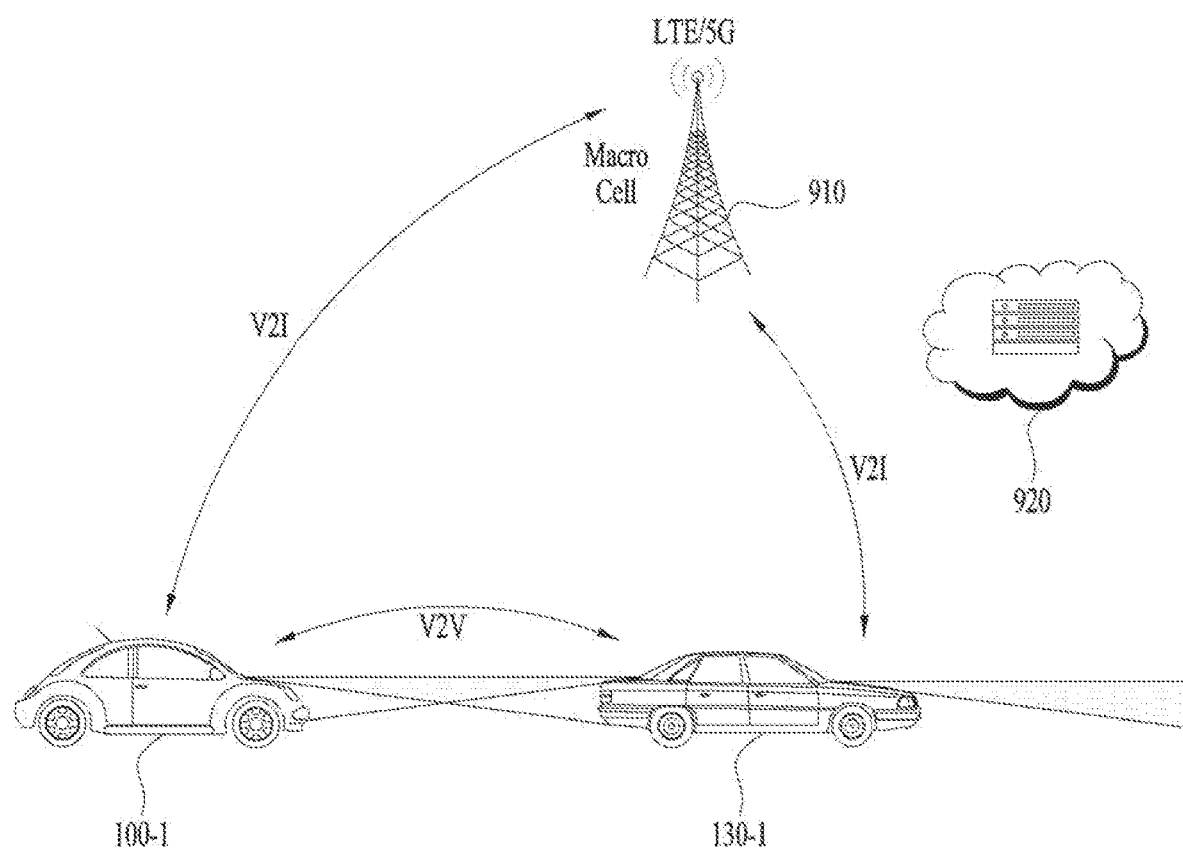

FIGS. 9 and 10 are diagrams for explaining a case in which suspension control information is transmitted via V2V and a case in which suspension control information is transmitted via V2I according to an embodiment of the present disclosure.

FIG. 9 shows a case in which a preceding mobility device 130-1 provides road surface information, which the preceding mobility device 130-1 obtains while driving, to a subsequent mobility device 100-1 as first suspension control information via direct V2V communication if the preceding mobility device 130-1 is within a predetermined distance from the subsequent mobility device 100-1. In this case, although UVO/Bluelink (LTE) may be used for the V2V communication, various V2V communication methods may also be used according to the standardization.

FIG. 10 illustrates a case in which various V2X methods are applied in addition to V2V communication shown in FIG. 9.

For example, there may be no preceding vehicles within a predetermined distance (for example, a range in which direct communication is allowed, a specific distance considering the vehicle speed limit, etc.) from the mobility device 130-1 on the driving route of the mobility device 130-1. If the road surface irregularity is higher than a predetermined level at night, a dangerous situation may occur. Accordingly, first suspension module control information, which is obtained by a preceding mobility device (not shown in the drawing) on the corresponding route based on road surface information, may be provided to a suspension control information server 920 through V2I communications and stored in the suspension control information server 920. When the corresponding mobility device 130-1 approaches the corresponding road surface, a base station 910 may provide the first suspension module control information to the corresponding mobility device 130-1 through V2I communications.

In the case of FIG. 10, if the preceding mobility device 130-1 is within a predetermined distance from a subsequent mobility device 100-1, the second suspension module control information may be provided rapidly via V2V communications. However, due to variables that may occur in V2V services, the subsequent mobility device 100-1 may also be configured to receive the second suspension module control information stored in the suspension control information server 920 through V2I communications.

As such, if suspension module control information about a specific road surface is accumulated in the suspension control information server 920, the suspension control information server 920 may provide optimal suspension module control information by learning the information based on artificial intelligence. For example, suspension module control information received from a vehicle may vary depending on the type of vehicle, the type of suspension module mounted in the vehicle, etc., and different suspension module control information may be provided depending on the type of vehicle receiving services, the type of suspension module mounted in the vehicle, etc.

The details of the preferred embodiments of the present disclosure are provided to allow those skilled in the art to implement and practice the present disclosure. While the present disclosure has been described and illustrated with reference to the preferred embodiments thereof, it will be apparent to those skilled in the art that various modifications and variations may be made therein without departing from the scope of the present disclosure. For example, those skilled in the art may combine configurations in the above-described embodiments.

Therefore, the present disclosure is not limited to the embodiments disclosed herein but intends to give the broadest scope consistent with the new principles and features disclosed herein.

The road surface detection apparatus having an active suspension function according to embodiments of the present disclosure and method therefor may be applied not only to vehicles, but also to various smart mobility devices such as robots and bikes.

What is claimed is:

1. A mobility device having an active suspension function, comprising:
    a sensor module comprising an inclinometer to output information on an inclination of a road surface over which the mobility device is traveling and a ride height sensor to output information on a height of the road surface over which the mobility device is traveling;
    a communication module configured to receive, via vehicle-to-everything (V2X) communication, first suspension module control information generated by a preceding mobility device on a driving route of the mobility device; and
    a suspension module located at a wheel of the mobility device and configured to control a suspension function of the mobility device based on the first suspension module control information before the mobility device arrives at a road surface position associated with the first suspension module control information using information on an inclination of the road surface and information on a height of the road service generated by the preceding mobility device similarly comprising an inclinometer and ride height sensor.

2. The mobility device of claim 1, further comprising a processor in communication with the communication module and the suspension module, wherein the processor is configured to adjust damping or stiffness of the suspension module based on the first suspension module control information received by the communication module before the mobility device arrives at the road surface position associated with the first suspension module control information.

3. The mobility device of claim 1, wherein the communication module is configured to receive, via vehicle-to-vehicle (V2V) communication, the first suspension module control information when the preceding mobility device is within a predetermined distance.

4. The mobility device of claim 1, wherein the communication module is configured to receive the first suspension module control information from a suspension control information server when the mobility device arrives at the road surface position associated with the first suspension module control information.

5. The mobility device of claim 1, wherein the first suspension module control information comprises at least one of:
    information on a height of a corresponding road surface;
    information on an inclination of the corresponding road surface; and
    information on a position of the corresponding road surface.

6. The mobility device of claim 5, wherein the information on the inclination of the corresponding road surface comprises at least one of:
    information on left and right inclinations with respect to the moving direction of the mobility device; and
    information on diagonal inclinations with respect to the moving direction of the mobility device.

7. The mobility device of claim 1, wherein:
    the sensor module further comprises a surface condition sensor, and the first suspension module control information comprises at least one of:
        information on a height of a corresponding road surface;
        information on an inclination of the corresponding road surface;
        information on a surface condition of the corresponding road surface; and
        information on a position of the corresponding road surface.

8. The mobility device of claim 1, further comprising a processor in communication with the sensor module and the communication module, wherein the processor is configured to:
    secure the road surface information obtained by the inclinometer and the ride height sensor during the driving of the mobility device;
    calculate the first suspension module information based on the road surface information; and
    provide the first suspension module information to the communication module.

9. The mobility device of claim 1, wherein the communication module is configured to provide, via vehicle-to-vehicle (V2V) communication, the first suspension module control information to a communication module of a subsequent mobility device when the subsequent mobility device is within a predetermined distance.

10. The mobility device of claim 1, wherein:
    the communication module is configured to provide the first suspension module control information to a suspension control information server, and
    a subsequent mobility device is provided with the first suspension module control information upon arriving at a position associated with the first suspension module control information.

11. The mobility device of claim 1, wherein the mobility device comprises at least one of a vehicle, a robot and a bike.

* * * * *